United States Patent [19]

Matsuda et al.

[11] Patent Number: 4,995,677

[45] Date of Patent: Feb. 26, 1991

[54] HYDRAULIC BRAKING PRESSURE CONTROL SYSTEM

[75] Inventors: Shohei Matsuda; Jiro Suzuki; Tsuyoshi Sato; Kazutoshi Tashima, all of Saitama, Japan

[73] Assignee: Honda Giken Kogyo Kabushiki Kaisha, Tokyo, Japan

[21] Appl. No.: 492,022

[22] Filed: Mar. 12, 1990

[30] Foreign Application Priority Data

Mar. 13, 1989 [JP] Japan .................................. 1-60243
May 22, 1989 [JP] Japan ................................ 1-128277

[51] Int. Cl.⁵ .............................................. B60T 8/32
[52] U.S. Cl. .................................. 303/113; 188/358; 303/52; 303/116; 303/119
[58] Field of Search .................................. 303/50–56, 303/113–119, 10; 188/358, 359; 60/547.1, , 545

[56] References Cited

U.S. PATENT DOCUMENTS

| 4,444,440 | 4/1984 | Farr ........................................ 303/50 |
| 4,892,361 | 1/1990 | Nishii et al. ..................... 303/113 X |
| 4,894,555 | 1/1990 | Watanabe et al. .................. 303/113 |

FOREIGN PATENT DOCUMENTS

| 0355324 | 8/1988 | European Pat. Off. . |
| 2450874 | 5/1975 | Fed. Rep. of Germany . |
| 2116559 | 7/1972 | France . |
| 55-63944 | 5/1980 | Japan . |
| 61-102360 | 5/1986 | Japan . |
| 61-53263 | 11/1986 | Japan . |
| 2084276 | 4/1982 | United Kingdom . |
| 2188994 | 10/1987 | United Kingdom . |
| 2189855 | 11/1987 | United Kingdom . |

Primary Examiner—Douglas C. Butler
Attorney, Agent, or Firm—Armstrong, Nikaido, Marmelstein, Kubovcik, & Murray

[57] ABSTRACT

In a hydraulic braking pressure control system comprising an auxiliary hydraulic pressure generator connected to a brake device for generating a hydraulic pressure depending upon a braking operation by a brake pedal; a supply source; a supply source pressure control device controlling the pressure from the supply source in accordance with the braking operation by the brake pedal; pressure transmitting device interposed in a hydraulic pressure path extending from the supply source via the supply source pressure control device to the brake device arranged to permit the transmission of the hydraulic pressure output from the supply source pressure control device to the brake device when the hydraulic pressure in the supply source is normal and to cut off the flowing of a working fluid from the brake device toward the supply source when the hydraulic pressure in the supply source is abnormally reduced; and an on-off valve interposed between the auxiliary hydraulic pressure generator and the brake device, having a pilot chamber leading to an output port of the supply source pressure control device, and adapted to be closed in response to an increase in the hydraulic pressure in the pilot chamber. The on-off valve is closed by rising of the output hydraulic pressure from the supply source pressure control device prior to rising of the output hydraulic pressure from the auxiliary hydraulic pressure generator during a braking operation by the brake pedal.

3 Claims, 4 Drawing Sheets

HYDRAULIC BRAKING PRESSURE CONTROL SYSTEM

BACKGROUND OF THE INVENTION

1. Field of the Invention

The present invention relates to a hydraulic braking pressure control system comprising auxiliary hydraulic pressure generating means connected to a brake device for generating a hydraulic pressure depending upon a braking operation by a brake pedal; a hydraulic pressure supply source; hydraulic pressure supply source hydraulic pressure control means capable of controlling the hydraulic pressure from the hydraulic pressure supply source in accordance with the braking operation by the brake pedal; hydraulic pressure transmitting means which is interposed in a hydraulic pressure path extending from the hydraulic pressure supply source via the hydraulic pressure supply source hydraulic pressure control means to the brake device and which is arranged to permit the transmission of the hydraulic pressure output from the hydraulic pressure supply source hydraulic pressure control means to the brake device when the hydraulic pressure in the hydraulic pressure supply source is normal and to cut off the flowing of a working fluid from the brake device toward the hydraulic pressure supply source when the hyrdraulic pressure in the hydraulic pressure supply source is abnormally reduced; and an on-off valve interposed between the auxiliary hydraulic pressure generating means and the brake device, having a pilot chamber leading to an output port of the hydraulic pressure supply source hydraulic pressure control means, and adapted to be closed in response to an increase in hydraulic pressure in the pilot chamber.

2. Description of the Prior Art

Such hydraulic braking pressure control system is conventionally known, for example, from Japanese Patent Publication No. 53263/86 and the like.

Such hydraulic braking pressure control system is constructed such that during a normal braking wherein the hydraulic pressure supply source is normal, the on-off valve is closed by the hydraulic pressure from the hydraulic pressure supply source hydraulic pressure control means, so that the hydraulic pressure from the hydraulic pressure supply source hydraulic pressure control means is applied to the brake device, while when the hydraulic pressure supply source is in failure, the hydraulic braking pressure is applied from the auxiliary hydraulic pressure generating means to the brake device in response to the opening of the on-off valve due to the reduction of the hydraulic pressure in the hydraulic pressure supply source. During a braking operation by the brake pedal, the hydraulic pressure is delivery from both of the auxiliary hydraulic pressure generating means and the hydraulic pressure supply source hydraulic pressure control means, and when the hydraulic pressure supply source is normal, the on-off valve should be closed by the hydraulic pressure control means before the hydraulic pressure from the auxiliary hydraulic pressure generating means is applied to the brake device. If not so, the operation of the brake device is not smooth.

In the above hydraulic braking pressure control system, if the hydraulic pressure from the hydraulic pressure supply source hydraulic pressure control means is applied to the brake device through the hydraulic pressure transmitting means before the on-off valve is closed by the output hydraulic pressure from the hydraulic pressure supply source hydraulic pressure control means is an initial stage of the braking operation by the brake pedal, the hydraulic braking pressure is applied to the brake device from both of the auxiliary hydraulic pressure generating means and the hydraulic pressure supply source hydraulic pressure control means before closing of the on-off valve. Therefore, it is necessary to apply the hydraulic pressure output from the hydraulic pressure supply source hydraulic pressure control means to the hydraulic pressure transmitting means after closing of the on-off valve.

Further, when the hydraulic pressure from the hydraulic pressure supply source hydraulic pressure control means and the hydraulic pressure from the auxiliary hydraulic pressure generating means are applied in a switched manner to the brake device, it is required that such switching is conducted concurrently in a plurality of brake devices.

SUMMARY OF THE INVENTION

The present invention has been accomplished with the above circumstances in view, and it is a first object of the present invention to provide a hydraulic braking pressure control system wherein during a normal braking operation when the hydraulic pressure supply source is normal, the on-off valve is reliably closed before the output hydraulic pressure from the auxiliary hydraulic pressure generating means is applied to the brake device, thereby providing a smoothed operation of the brake device.

To achieve the first object, a feature of a hydraulic braking pressure control system according to the present invention resides in that the on-off valve is closed by rising of the output hydraulic pressure from the hydraulic pressure supply source hydraulic pressure control means prior to rising of the output hydraulic pressure from the auxiliary hydraulic pressure generating means during a braking operation by the brake pedal.

With such a construction, during the braking operation by the brake device when the hydraulic pressure supply source is normal, the output hydraulic pressure from the hydraulic pressure supply source hydraulic pressure control means is first rised and then, the output hydraulic pressure from the auxiliary hydraulic braking pressure from the auxiliary hydraulic pressure generating means cannot be applied to the brake device.

In addition, it is a second object of the present invention to provide a hydraulic braking pressure control system wherein the output hydraulic pressure from the hydraulic pressure supply source hydraulic pressure control means is applied to the hydraulic pressure transmitting means after the on-off valve is closed.

To achieve the second object, another feature of the present invention is in that the hydraulic pressure transmitting means comprises a free piston slidably received in a cylinder body with opposite ends of the piston facing an input hydraulic pressure chamber leading to an output port of the hydraulic pressure supply source hydraulic pressure control means and an output hydraulic pressure chamber leading to the brake device, respectively; and the system further includes a branched hydraulic fluid passage diverged from an output hydraulic pressure passage which connects the output port of the hydraulic pressure supply source hydraulic pressure control means with an input hydraulic pressure chamber of the hydraulic pressure transmitting means, the branched hydraulic fluid passage leading to the pilot chamber, a first unidirectional valve for permitting the flowing of a working fluid from the hydraulic pressure supply source hydraulic pressure control means toward the hydraulic pressure transmitting means in response to the application of a differential pressure more than a preset level, and a second unidirectional valve adapted to be opened in response to the application of a differential pressure more than a preset level to permit the flowing of the working fluid from the hydraulic pressure transmitting means toward the hydraulic pressure supply source hydraulic pressure control means, the first and second unidirectional valves being disposed in parallel in a section of the output hydraulic pressure passage extending from a diverged point of the branched hydraulic fluid passage to the hydraulic pressure transmitting means.

With such a construction, the first unidirectional valve can be opened to allow the hydraulic pressure to be applied to the hydraulic pressure transmitting means, after the on-off valve is closed upon the increasing of the hydraulic pressure in the pilot chamber during rising of the hydraulic pressure in the hydraulic pressure supply source. In addition, when the hydraulic pressure in the input hydraulic pressure chamber in the hydraulic pressure transmitting means is increased due to a variation in temperature or other reasons, the hydraulic pressure in the input hydraulic pressure chamber can be escaped through the second unidirectional valve.

Further, it is a third object of the present invention to provide a hydraulic braking pressure control system designed to synchronously change-over connections of the hydraulic pressure supply source hydraulic pressure control means and the auxiliary hydraulic pressure generating means with a plurality of braking devices.

To attain the third object, a further feature of the present invention is in that the brake device is formed of a plurality of brake devices and the on-off valve is constructed to have a valve element which is capable of collectively opening and closing a plurality of valve bores leading to the plurality of brake devices and which is operable to close the valve bores in response to an increase in the hydraulic pressure in the pilot chamber.

With such a construction, the valve bores leading to the plurality of brake devices can be opened or closed concurrently, ensuring that the switching of the hydraulic braking pressures for the individual brake devices can be reliably conducted.

The above and other objects, features and advantages of the invention will become apparent from a reading of the following description of the preferred embodiments, taken in conjunction with the accomplished drawings:

BRIEF DESCRIPTION OF THE DRAWINGS

FIGS. 1 to 3 illustrate one embodiment of the present invention, wherein

DESCRIPTION OF THE PREFERRED EMBODIMENTS

The present invention will now be described by way of embodiments to which it is applied to a hydraulic braking pressure control system for a front engine and front drive vehicle with reference to the accompanied drawings.

Figure 1:
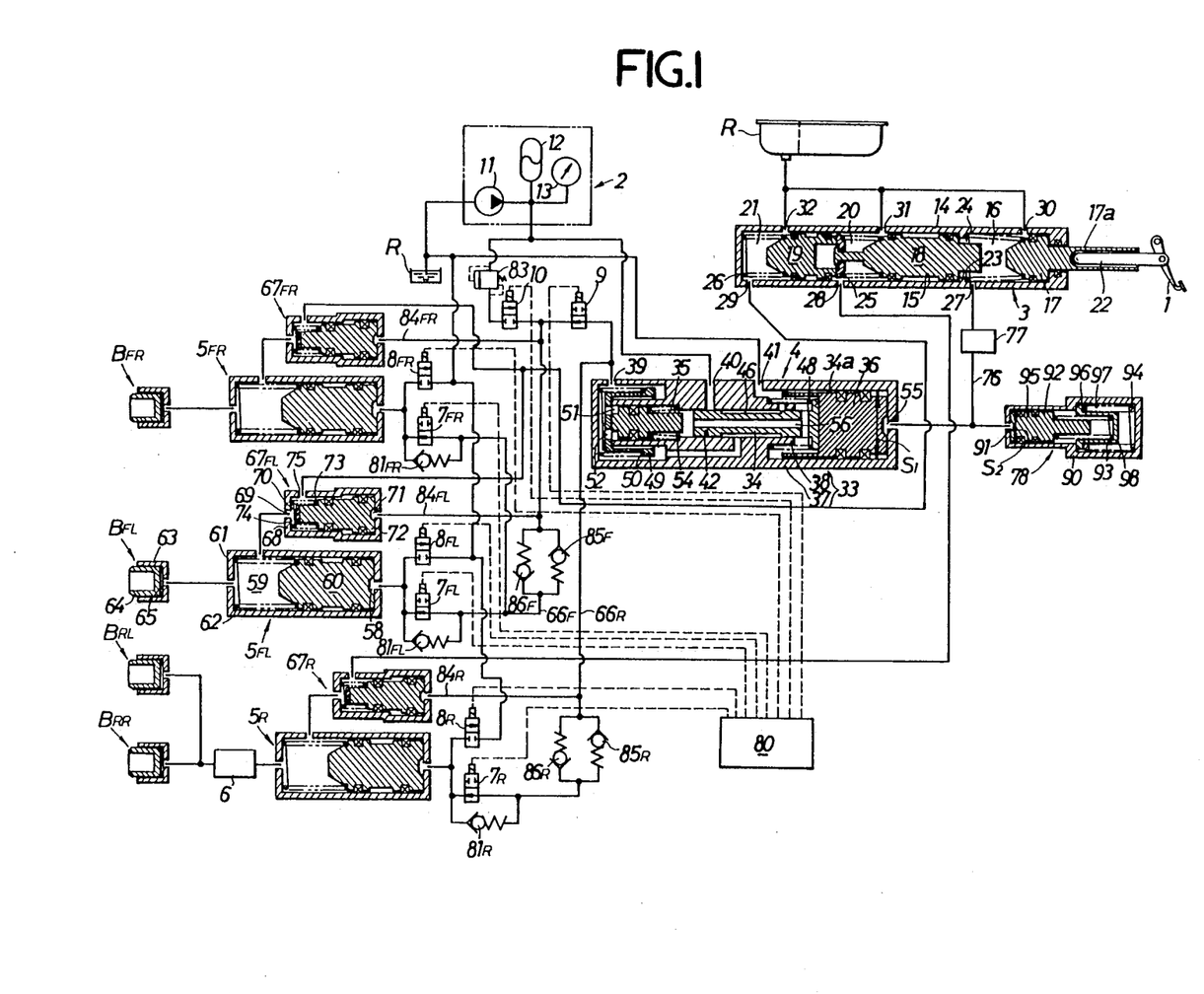
FIG. 1 is a diagram of an oil hydraulic circuit.
Figure 2:
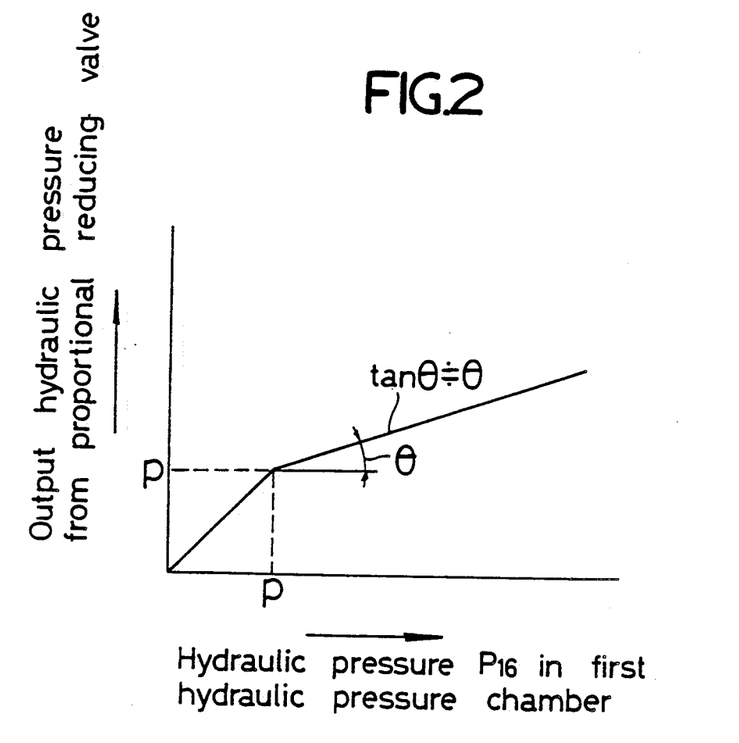
FIG. 2 is a graph illustrating a pressure reducing characteristic of a proportional reducing valve.

First, one embodiment of the present invention will be described with reference to FIGS. 1 to 3. A left front wheel brake device $B_{FL}$ and a right front wheel brake device $B_{FR}$ are mounted on left and right front wheels of a vehicle, respectively, and a left rear wheel brake device $B_{RL}$ and a right rear wheel brake device $B_{RR}$ are mounted on left and right rear wheels, respectively.

Auxiliary hydraulic pressure generating means 3 is connected to a brake pedal 1 to produce a hydraulic pressure according to an amount of brake pedal 1 depressed, so that during a normal braking, a hydraulic pressure supplied from a hydraulic pressure supply source 2 and controlled by hydraulic pressure supply source hydraulic pressure control means 4 is accordance with the hydraulic pressure delivered from the auxiliary hydraulic pressure generating means 3 is applied to each of the front wheel brake device $B_{FL}$ and $B_{FR}$, and a hydraulic pressure from the hydraulic pressure supply source hydraulic pressure control means 4 is applied to each of the rear wheel brake devices $B_{RL}$ and $B_{RR}$ through a proportional reducing valve 6. In addition, during a braking operation in the event where the hydraulic pressure supply means 2 has fallen into a failure, a hydraulic pressure produced by the auxiliary hydraulic pressure generating means 3 is applied to each of the brake devices $B_{FL}$, $B_{FR}$, $B_{RL}$ and $B_{RR}$. Further, an inlet solenoid valve $7_{FL}$, $7_{FR}$ and an outlet solenoid valves $8_{FL}$, $8_{FR}$ are independently mounted in each of the front wheel brake devices $B_{FL}$ and $B_{FR}$ as well as an inlet solenoid valve $7_R$ and an outlet solenoid valve $8_R$ commonly mouned in the rear wheel brakes $B_{RL}$ and $B_{RR}$ can be used to maintain or reduce the hydraulic braking pressures for the individual brake devices $B_{FL}$, $B_{FR}$, $BR_{RL}$ and $B_{RR}$ to provide an anti-lock control, and the hydraluic pressure for the front wheel brake devices $B_{FL}$ and $B_{FR}$ can be increased by the operation of traction-controlling normally-opened solenoid valve 9 and normally-closed solenoid valve 10 to provide a traction control.

The hydraulic pressure supply source 2 comprises a hydraulic pump 11 for pumping a work fluid from a reservoir R, an accumulator 12 connected to the hydraulic pump 11, and a pressure switch 13 for controlling the operation of the hydraulic pump 11.

The auxiliary hydraulic pressure generating means 3 includes a housing 14 formed into a cylindrical shape with its opposite ends closed. Slidably received in a cylinder bore 15 provided in the housing 14 are a first working piston 17, a second working piston 18 disposed at a distance in front of the first working piston 17 and a third working piston 19 disposed at a distance in front of the second working piston 18. A first hydraulic pressure chamber 16 is defined between the first and second working pistons 17 and 18, and a second hydraulic pressure chamber 20 is defined in front of the second working piston 28, i.e., between the second third working pistons 18 and 19 and further, a third hydraulic pressure chamber 21 is defined between a front end wall of the cylinder bore 15 and the third working piston 19.

The first working piston 17 is integrally provided with a pistol rod 17a which projects outwardly to oiltightly and movably pass through a rear end wall of the cylinder bore 15, so that a front end of an urging rod 22 connected to the brake pedal 1 abuts against a rear end of the piston rod 17a. Thus, the first working position 17 is advanced within the cylinder bore 15 in response to a braking operation of the brake pedal 1.

A radially projecting stopper 23 is mounted on an inner surface of the cylinder bore 15 and adapted to abut against a rear end of the second working piston 18 to restrain the retreat limit of the second working piston 18, and a first return spring 24 is provided in a compressed manner between the stopper 23 and the first working piston 17 for biasing the first working piston 17 rearwardly. In addition, a second return spring 25 is contained in the second hydraulic pressure chamber 20 for biasing the second and third working pistons 18 and 19 away from each other, and a third return spring 26 is provided in a compressed manner between the front end wall of the cylinder bore 15 and the third working piston 19 for biasing the third working piston 19 rearwardly. This permits the second and third working pistons 18 and 19 to be advanced by a hydraulic pressure developed in the first hydraulic pressure chamber 16 in correspondence to the forward or advancing movement of the first working piston 17.

The housing 14 is provided with a first output port 27 leading to the first hydraulic pressure chamber 16, a second output port 28 leading to the second hydraulic pressure chamber 20, and a third output port 29 leading to the third hydraulic pressure chamber 21, as well as communication ports 30, 31 and 32 which permit the hydraulic pressure chambers 30, 31 and 32 which permit the hydraulic pressure chambers 16, 20 and 21 to be put into communication with the reservoir R only when the first working piston 17 and the second and third working pistons 18 and 19 have been returned to their retreat limits.

The hydraulic pressure supply source hydraulic pressure control means 4 comprises a housing 33, and a spool 34, a reaction piston 35 and an urging piston 36 which are slidably received in the housing 33.

The housing 33 is comprised of an outer tubular portion 37 closed at its opposite ends, and an inner tubular portion 38 opened at its opposite ends and coaxially disposed within the outer tubular portion 37, the outer and inner tubular portions being securely connected at their middle portions to each other. The outer tubular portion 37 includes an output port 39, an input port 40 leading to the hydraulic pressure supply source 2 and a release port 41 leading to the reservoir R which are provided at distances in sequence from the front side to the rear side (from the left side to the right side as viewed in FIG. 1). The inner tubular portion 38 is also provided with a cylinder bore 42, and the input port 40 is opened into an inner surface of the cylinder bore 42. Moreover, an annular recess 46 is provided on an outer surface of the spool 34 slidably received in the cylinder bore 42 and has an axial length which is set to permit the communication between the output port 39 and the release port 41 when the spool 34 is in a rear position and to permit the communication between the output port 39 and the input port 40 when the spool 34 is in a front position.

A radially outwardly projecting collar 34a is provided on a rear end of the spool 34, and a control spring 48 is mounted in a compressed manner between the collar 34a and the housing 33, so that the spool 34 is biased rearwardly by a spring force of the control spring 48.

The reaction piston 35 is slidably received in the cylinder bore 42 in front the spool 34 for movement to about against a front end of the spool 34. On the other hand, a hat-like member 49 is received in a front end of the inner tubular portion 38 and biased rearwardly by a spring force of a spring 50 mounted in a compressed manner between the hat-like member 49 and a front end wall of the outer tubular portion 37. An output pressure action chamber 51, to which is faced a front surface of the reaction piston 35, is defined between the hat-like member 49 and the reaction piston 35 to communicate with the output port 39 through a communication hole 52 made in the hat-like member 49.

A spring 54 is mounted in a compressed manner between the reaction piston 35 and a step provided on an inner surface of the cylinder bore 42 at a place more forward than the spool 34, so that the reaction piston 35 is biased forwardly by a spring force of the spring 54. Moreover, the set load of the spring 54 is set at a smaller level than that of the spring 50, so that in a condition of no hydraulic pressure applied to the output pressure action chamber 51, a front end of the reaction piston 35 is in abutment against the hat-like member 49 which is biased by the spring 50 into abutment against the front end of the inner tubular portion 38.

A communication passage 56 is provided in the spool 34 and opened into the front end face of the spool 34 so as to communicate with the release port 41. Therefore, a hydraulic pressure cannot be applied to a back face of the reaction piston 35 and to the front face of the spool 34.

The urging piston 36 is slidably received in the outer tubular portion 37 in the housing 33 behind the spool 34 to coaxially abut against a rear end thereof, and a back face of the urging piston 36 is faced to an input pressure action chamber 55 which is defined between such back face and a rear end wall of the outer tubular portion 37.

In the hydraulic pressure supply source hydraulic pressure control means 4, the spool 34 is axially moved by a balance of a rearward oil pressure applied to the reaction piston 35 by the hydraulic pressure in the output pressure action chamber 51 with a forward oil pressure applied to the urging piston 36 with the hydraulic pressure in the input pressure action chamber 55. That pressure receiving area of the urging piston 36 which faces to the input pressure action chamber 55 is set at a larger level than that pressure receiving area of the reaction piston 35 which faces to the output pressure action chamber 51. This enables the spool 34 to be axially driven even if the hydraulic pressure introduced into the input pressure action chamber 55 is relatively low.

The distance of movement of the spool 34 from a retreat limit position (a position shown in FIG. 1) to a position in which the input port 40 is put into communication with the output port 39 is set at a smaller level than the distance between the front end of the spool 34 which is in its retreat limit position and the rear end of the reaction piston 35 which is in its front position in a condition of no hydraulic pressure applied to the output pressure action chamber 51. Therefore, when a hydraulic pressure has been applied to the input pressure action chamber 55 under a condition of no hydraulic pressure applied to the input and output pressure action chambers 51 and 55 as shown in FIG. 1, thereby causing the urging piston 36 to move the spool 34 forwardly, no reaction, upon communication of the annular recess 46 with the input port 40, is applied to the urging piston 36 until the hydraulic pressure is increased to permit the reaction piston 35 to about against the spool 34. This enables a rapid increasing of the braking pressure at an initial stage of the braking operation to smooth the initial braking operation.

An oil passage 76 leading to the input pressure action chamber 55 in the hydraulic pressure supply source hydraulic pressure control means 4 is connected through a proportional reducing valve 77 to the first output port 27 in the auxiliary hydraulic pressure generating means 3. The proportional pressure reducing valve 77 permits the hydraulic pressure from the first output port 27 to be proportionally reduced and applied to the input pressure action chamber 55 after the hydraulic pressure has reached a given valve, and such valve 77 has a conventionally well-known structure. The hydraulic pressure $P_{16}$ in the first hydraulic pressure chamber 16 in the auxiliary hydraulic pressure generating means 3 is reduced for example as shown in FIG. 2 and then delivered from the proportional reducing valve 77. More specifically, the proportional reducing 77 delivers the hydraulic pressure $P_{16}$ in the first hydraulic pressure chamber 16 as it is, until the hydraulic pressure $P_{16}$ reaches a given value p, but delivers it while proportionally reducing it at a gradient of an angle O after it has exceeded the given value p.

An accumulator 78 is connected to the oil passage 76 between the proportional reducing valve 77 and the input pressure action chamber 55. The accumulator 78 comprises an accumulator body 90, an accumulator piston 92 slidably received in the accumulator body 90 to define an accumulating chamber 91 therebetween, which leads to the oil passage 76, and a first and a second accumulator springs 93 and 94 which are interposed in series between the accumulator piston 92 and the accumulator body 90 so as to bias the accumulator piston 92 in a direction to reduce the volume of the accumulating chamber 91.

The accumulator body 90 is provided with a smaller diameter hole 95 closed at one end thereof, and a larger diameter hole 97 coaxially connected at one end thereof through a step 96 to the other end of the smaller diameter hole 95 and closed at the other end thereof, and the accumulator piston 92 is slidably received in the smaller diameter hole 95. Moreover, the accumulating chamber 91 is defined between the one end of the accumulator piston 92 and the closed one end of the smaller diameter hole 95. In addition, a spring receiving member 98 is axially movably contained in the larger diameter hole 97 and adapted to about against the step 96 for restraint of the movement thereof toward the one end. The first accumulator spring 93 is mounted in a compressed manner between the accumulator piston 92 and the spring receiving member 98, and the second accumulator spring 94 is likewise between the spring receiving member 98 and the other closed end of the larger diameter hole 97. Furthermore, the set load of the first accumulator spring 93 is set at a smaller level than that of the second accumulator spring 94. Thus, under a condition of no hydraulic pressure applied to the accumulating chamber 91, the spring receiving member 98 is in a position in which it has been allowed to abut against the step 96 by a spring force of the accumulator spring 94.

Here, the hydraulic pressure developed in the first hydraulic pressure chamber 16 by the forward operation of the first working position 17 in accordance with the depressing operation of the brake pedal 1 is accumulated in the accumulator 78 through the proportional reducing valve 77 and applied to the input pressure action chamber 55, but the hydraulic pressure in the input pressure action chamber 55 set to start the operation of the hydraulic pressure supply source hydraulic pressure control means 4 in such a manner to start the operation of the latter prior to the operation of the accumulator 78 is set at a lower level than an accumulated operation-starting pressure in the accumulator 8. In other words, such hydraulic pressure is set so that the following expression (1) is established:

$$f_1/S_1 > f_2/S_2 \tag{1}$$

wherein $S_1$ represents that pressure receiving area of the urging piston 36 which faces to the input pressure action chamber 55 in the hydraulic pressure supply source hydraulic pressure control means 4; $S_2$ represents that pressure receiving area of the accumulator piston 92 which faces to the accumulating chamber 91; $f_1$ represents the set load of the control spring 48 in the hydraulic pressure supply source hydraulic pressure control means 4; and $f_2$ represents the set load of the first accumulator spring 93 in the accumulator 78.

Hydraulic pressure transmitting means $5_{FL}$, $5_{FR}$ and $5_R$ are provided between the output port 39 in the hydraulic pressure supply source hydraulic pressure control means 4 and the brake devices BFL, BFR, BRL and BRRL. The hydraulic pressure transmitting means $5_{FL}$ and $5_{FR}$ are interposed between the traction-controlling normally-opened solenoid valve 9 connected to the output port 39 in the hydraulic pressure supply source hydraulic pressure control means 4 and the brake devices $B_{FL}$ and $B_{FR}$, and the hydraulic pressure transmitting means $5_R$ is interposed between the output port 39 and the proportional reducing valve 6 connected to the brake device $B_{RL}$ and $B_{RR}$. These hydraulic pressure transmitting means $5_{FL}$, $5_{FR}$ and $5_R$ function to transmit the hydraulic pressure from the hydraulic pressure supply source hydraulic pressure control means 4 to the brake devices $B_{FL}$, $B_{FR}$, $B_{RL}$ and $B_{RR}$ when the hydraulic pressure from the hydraulic pressure supply source 2 is normal, but to inhibit a working oil from reversely flowing from the brake devices $B_{FL}$, $B_{FR}$, $B_{RL}$ and $B_{RR}$ toward the hydraulic pressure supply source 2 when the hydraulic pressure from the hydraulic pressure supply source 2 has been abnormally reduced. They have basically the same construction, and the construction of one $5_{FL}$ representative of the hydraulic pressure transmitting means will be described below.

The hydraulic pressure transmitting means $5_{FL}$ comprises a free piston 60 slidably received in a cylinder body 61 with its opposite ends facing to the input and output hydraulic pressure chambers 58 and 59, and a spring 62 disposed and contained in the output hydraulic pressure chamber 59 for biasing the free piston 60 toward the input hydraulic pressure chamber 58.

With such a construction of the hydraulic pressure transmitting means $5_{FL}$, a hydraulic pressure corresponding to the hydraulic pressure applied to the input hydraulic pressure chamber 58 can be delivered from the output hydraulic pressure chamber 59, and the hydraulic pressure in the output hydraulic pressure chamber 59 cannot flow toward the input hydraulic pressure chamber 58. The output hydraulic pressure chamber 59 is connected to the brake device $B_{FL}$.

More specifically, each of the brake devices $B_{FL}$, $B_{FR}$, $B_{RL}$ and $B_{RR}$ comprises a cylinder body 63 and a braking piston 64 slidably received in the cylinder body 63, so that a braking pressure is exhibited by the movement of the braking piston 64 corresponding to the hydraulic pressure applied to a hydraulic braking pressure chamber 65 defined between the cylinder body 63 and the braking piston 64. The output hydraulic pressure chamber 59 communicates with the hydraulic braking pressure chamber 65.

The inlet solenoid valve $7_{FL}$, $7_{FR}$ and the outlet solenoid valve $8_{FL}$, $8_{FR}$ are connected, in parallel, to the input hydraulic pressure chamber 58 of the hydraulic pressure transmitting means $5_{FL}$, $5_{FR}$ corresponding to the front wheel brake device $B_{FL}$, $B_{FR}$, and the inlet solenoid valve $7_R$ and the outlet solenoid valve $8_R$ are connected, in parallel, to the input hydraulic pressure chamber 58 of the hydraulic pressure transmitting means $5_R$ corresponding to the front wheel brake device $B_{RL}$, $B_{RR}$.

Each of the inlet solenoid valves $7_{FL}$, $7_{FR}$ and $7_R$ is a solenoid valve which is shut off during excitation, and each of the outlet solenoid valves 8FL, 8FR and 8R is a solenoid valve which is opened for communication during excitation. The outlet solenoid valves $8_{FL}$, $8_{FR}$ and $8_R$ are interposed between the input hydraulic pressure chambers 58 of the hydraulic pressure transmitting means $5_{FL}$, $5_{FR}$ and $5_R$ and the reservoir R, respectively. The inlet solenoid valves $7_{FL}$ and $7_{FR}$ are interposed between the input hydraulic pressure chambers 58 of the hydraulic pressure transmitting means $5_{FL}$ and $5_{FR}$ and an output hydraulic pressure passage $66_F$, respectively, and the inlet solenoid valve $7_R$ is interposed between the input hydraulic pressure chamber 58 of the hydraulic pressure transmitting means $5_R$ and an output hydraulic pressure passage $66_R$. Further, hydraulic pressure releasing unidirectional valves $81_{FL}$, $81_{FR}$, and $81_R$ are connected in parallel to the corresponding inlet solenoid valves $7_{FL}$, $7_{FR}$, and $7_R$ and permit only the flowing of the working fluid from the input hydraulic pressure chambers 58 toward the output oil passages $66_F$ and $66_R$.

The excitation and deexcitation of the inlet and outlet solenoid valves $7_{FL}$, $7_{FR}$, and $7_R$ and $8_{FL}$, $8_{FR}$, and $8_R$ are controlled by control means 80 which maintains the inlet solenoid vales $7_{RL}$, $7_{FR}$, and $7_R$ deexcited during a normal braking, but which is switchable, during an anti-lock control, among a pressure-reducing control condition in which both of the inlet and outlet solenoid valves $7_{FL}$, $7_{FR}$, and $7_R$ and $8_{FL}$, $8_{FR}$, and $8_R$ are excited, a pressure-maintaining condition in which the inlet solenoid valves $7_{FL}$, $7_{FR}$, and $7_R$ are excited, while the outlet solenoid valves $8_{FL}$, $8_{FR}$, and $8_R$ are deexcited, and a pressure-increasing control condition in which both of the inlet and outlet solenoid valves 7FL, 7FR, and 7R and 8FL, 8FR, and 8R are deexcited.

The output hydraulic pressure passage $66_F$ is connected to the output port 39 in the hydraulic pressure supply source hydraulic pressure control means 4 through the traction-controlling normally-opened solenoid valve 9, and the output hydraulic pressure passage $66_R$ is connected directly to the output port 39 in the hydraulic pressure supply source hydraulic pressure control means 4. Additionally, the output hydraulic pressure passage $66_F$ is connected between the input port 40 in the hydraulic pressure supply source hydraulic pressure control means 4 and the hydraulic pressure supply means 2 through the traction-controlling normally-closed solenoid valve 10 and a differential pressure constant type reducing valve 83.

The excitation and deexcitation of the solenoid valves 9 and 10 are also controlled by the control means 80 which deexcites the solenoid valve 9 to open it and deexcites the solenoid valve 10 to close it in a normal condition, and which excites the solenoid valve 9 to close it and excites the solenoid valve 10 to open it during a traction control in a driving condition, thereby permitting the working oil from the hydraulic pressure supply source 2 to be reduced by the reducing valve 83 and supplied to the output oil passage $66_F$. Further, the control means 80 is also capable of controlling the switching between the excitation and deexcitation of the solenoid valve 9 during increasing of the pressure in the anti-lock controlled condition, i.e., in a condition in which both of the inlet and outlet solenoid valves $7_{FL}$, $7_{FL}$, and $7_R$ and $8_{FL}$, $8_{FR}$, and $8_R$ are deexcited.

The proportional reducing valve 6 functions to proportionally reduce the hydraulic pressure delivered from the output hydraulic pressure chamber 59 in the hydraulic pressure transmitting means $5_R$ when the pressure is more than a certain value, thereby applying the reduced pressure to the hydraulic braking pressure chambers 65 in the rear wheel brake devices $B_{RL}$ and $B_{RR}$.

The second output port 28 in the auxiliary hydraulic pressure generating means 3 is connected between the proportional reducing valve 6 and the hydraulic pressure transmitting means $5_R$ through an on-off valve $67_R$, and the third output port 29 in the auxiliary hydraulic pressure generating means 3 is connected between the left front wheel brake device $B_{FL}$ and the hydraulic pressure transmitting means $5_{FL}$ through an on-off valve $67_{FL}$ and also between the right rear wheel brake device $B_{FR}$ and the hydraulic pressure transmitting means $5_{FR}$ through an on-off value $67_{FR}$. The on-off valves $67_{FL}$, $67_{FR}$ and $67_R$ have the same construction, and only the construction of the on-off valve $67_{FL}$ will be described below.

The on-off valve $67_{FL}$ comprises a cylindrical on-off valve body 68 closed at its opposite ends, a valve bore 69 made in one end wall of the on-off valve body 68 to communicate with the output hydraulic pressure chamber 59 in the hydraulic pressure transmitting means $5_{FL}$, an opening and closing piston 72 slidably received in the on-off valve body 68 and having at one end thereof a valve element 70 capable of closing the valve bore 69 and facing at the other end thereof to a pilot chamber 71, and a spring 73 interposed between the on-off valve body 68 and the opening and closing piston 72 for biasing the opening and closing piston 72 toward the pilot chamber 71.

A valve chest 74 is defined between one end wall of the on-off valve body 68 and the opening and closing piston 72 and adapted to communicate with the valve bore 69, and the spring 73 is contained in the valve chest 74. An inlet port 75 is also made in the on-off valve body 68 to communicate with the valve chest 74 and the third output port 29.

Such on-off valve $67_{FL}$ is open with the opening and closing piston 72 moved toward the pilot chamber 71 to a position in which the valve element 70 opens the valve bore 69 when the hydraulic pressure in the pilot chamber 71 is lower than a given value, and when the hydraulic pressure in the pilot chamber 71 becomes equal to or more than the given value, the opening and closing piston 72 is moved so that the valve element 70 closes the valve bore 69, thus closing the on-off valve $67_{FL}$.

A branched hydraulic fluid passage $84_{FL}$ diverged from the output oil passage $66_F$ is in communication with the pilot chamber 71. Thus, in a condition in which the hydraulic pressure in the passage $84_{FL}$ and thus in the pilot chamber 71 is higher, the on-off valve $67_{FL}$ is closed to put the third output port 29 and the brake device $B_{FL}$ out of communication with each other. When the hydraulic pressure in the branched hydraulic fluid passage $84_{FL}$ has become lower, the on-off valve $67_{FL}$ is opened to put the third output port 29 and the brake device $B_{FL}$ into communication with each other.

In addition, when the hydraulic pressure in a branched hydraulic fluid passage $84_{FR}$ diverged from the output hydraulic pressure passage $66_F$ is higher, the on-off valve $67_{FR}$ is closed to put the third output port 29 and the brake device $B_{FR}$ out of communication with each other, and when the hydraulic pressure in the fluid passage $84_{FR}$ is lower, and on-off valve $67_{FR}$ is opened to put the third output port 29 and the brake device $B_{FR}$ into communication with each other. Further, in a condition in which the hydraulic pressure in a branched hydraulic fluid passage $84_R$ diverged from the output hydraulic pressure passage $66_R$ is higher, the on-off valve $67_R$ is closed, thereby putting the second output port 28 in the auxiliary hydraulic pressure generating means 3 and the brake device $B_{RL}$, $B_{RR}$ out of communication with each other. When the hydraulic pressure in the fluid passage $84_R$ has become lower, the on-off value $67_R$ is opened to put the second output port 28 and the brake device $B_{RL}$, $B_{RR}$ into communication with each other.

A first unidirectional valve $85_F$ is disposed in the output hydraulic pressure passage $66_F$ at a location closer to the hydraulic pressure transmitting means $5_{FL}$ and $5_{FR}$ than diverged points of the fluid passages $84_{FL}$ and $84_{FR}$, and a first unidirectional valve $85_R$ is disposed in the output hydraulic pressure passage $66_R$ at a location closer to the hydraulic pressure transmitting means $5_R$ than a diverged point of the fluid passage $84_R$. The unidirectional valves $85_F$ and $85_R$ are opened in response to a differential pressure more than a preset first valve-opening pressure $\Delta p_1$ to permit only the flowing of the working oil from the side of the output port 39 toward the hydraulic pressure transmitting means $5_{FL}$, $5_{FR}$ and $5_R$.

Second unidirectional valves 86F and 86R are connected, in parallel, to the first unidirectional valves $85_F$ and $85_R$. These second unidirectional valves $86_F$ and $86_R$ are opened in response to a differential pressure more than a preset second valve-opening pressure $p_2$ to permit only the flowing of the working fluid from the side of the hydraulic pressure transmitting means $5_{FL}$, $5_{FR}$ and $5_R$ toward the output port 39. The second valve-opening pressure $p_2$ is set at a smaller level than the first valve-opening pressure $\Delta p_1$ ($\Delta p_2 < \Delta p_1$).

The on-off valves $67_{FL}$, $67_{FR}$ and $67_R$ are operable to be closed by the operation of the hydraulic pressure supply source hydraulic pressure control means 4 by the hydraulic pressure in the first hydraulic pressure chamber 16 prior to rising of the hydraulic pressures in the second and third hydraulic pressure chambers 20 and 21 in the auxiliary hydraulic pressure generating means 3 during a braking operation by the brake pedal 1 when the hydraulic pressure supply source 2 is in normal operation, and the following values are set as described hereinbelow.

More specifically, an input force F of the urging rod 22 by the braking operation of the brake pedal 1 is represented in the following expression (2):

$$F = P_{16} \times SP_{17} + F_{24} \qquad (2)$$

wherein $SP_{17}$ represents that pressure receiving area of the first working piston 17 which faces to the first hydraulic pressure chamber 16, and $F_{24}$ represents a load of the first return spring 24. A relationship between the hydraulic pressure $P_{16}$ in the first hydraulic pressure chamber 16 and the hydraulic pressure $P_{55}$ in the input hydraulic pressure action chamber 55 in the hydraulic pressure supply source hydraulic pressure control means 4, i.e., the output hydraulic pressure from the proportional reducing valve 77 shown in FIG. 2 is as follows:

When $P_{16} \leq p$, $$P_{55} = P_{16} \qquad (3), \text{ and}$$

when $P_{16} > p$, $$P_{55} = p + (P_{16} - p) \times \theta \qquad (4)$$

In the hydraulic pressure supply source hydraulic pressure control means 4, the hydraulic pressure $P_{55}$ in the input hydraulic pressure action chamber 55 for allowing the urging piston 36 to move against a load $F_{48}$ of the control spring 48 to drive the spool 34 to a position in which the output port 39 communicates with the input port 40 is represented in the following expression (5)

$$P_{55} = F_{48}/SP_{36} \qquad (5)$$

wherein $SP_{36}$ (equal to the $S_1$, $SP_{36} = S_1$) represents that pressure receiving area of the urging piston 36 which faces to the input pressure action chamber 55. In addition, the hydraulic pressure in the output pressure action chamber 51, i.e., the hydraulic pressure $P_J$ in the output port 39 when the reaction piston 35 starts to move against the load $F_{54}$ of the spring 54 to drive the spool 34 to a position in which the output port 39 communicates with the release port 41 is represented in the following expression (6):

$$P_J = F_{54}/SP_{35} \qquad (6)$$

wherein $SP_{35}$ represents that pressure receiving area of the reaction piston 35 which faces to the output pressure action chamber 51. Further, the output hydraulic pressure Pc from the output port 39 after the generation of the hydraulic pressure $P_J$ satisfies a relationship represented in the following expression (7):

$$Pc \times SP_{35} = P_{55} \times SP_{36} \qquad (7)$$

Figure 3:
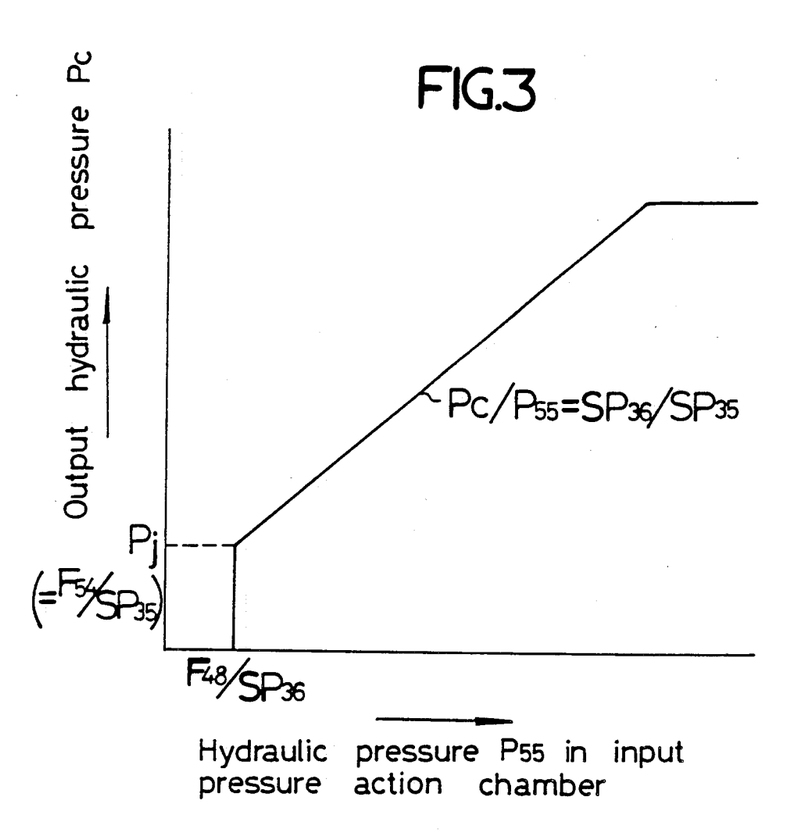
FIG. 3 is a graph illustrating an output hydraulic pressure characteristic of hydraulic pressure supply source hydraulic pressure control means.

A relationship between the hydraulic pressure $P_{55}$ in the input pressure action chamber 55 and the output hydraulic pressure Pc derived from the above expressions (5) to (7) is as shown in FIG. 3.

Specifically, when $P_{55} \leq F_{48}/SP_{36}$, the output hydraulic Pc=0, and when $P_{55} > F_{48}/SP_{36}$, the output hydraulic Pc is represented in an expression (8):

$$Pc = SP_{36}/SP_{35} \times (P_{55} - F_{48}/SP_{36}) + F_{54}/SP_{35} \qquad (8)$$

If the expression (8) is substituted for the expressions (3) and (4), the following expressions (9) and (10) are obtained. Specifically, when the hydraulic pressure $P_{16}$ in the first hydraulic pressure chamber 16 in the auxiliary hydraulic pressure generating means 3 is less than p ($P_{16} \leq p$), $$Pc = SP_{36}/SP_{35} \times (P_{16} - F_{48}/SP_{36}) + F_{54}/SP_{35} \quad (9)$$

and when $P_{16} > p$, $$Pc = SP_{36}/SP_{35} \times [\{p + (P_{16} - p) \times \theta\} - F_{48}/SP_{36}] + F_{54}/SP_{35} \quad (10)$$

In the on-off valves $67_{FL}$, $67_{FR}$ and $67_R$, the hydraulic pressure $P_{71}$ in the pilot chamber 71 required for the opening and closing pistons 72 to close the corresponding on-off valves when the hydraulic pressure in the valve chest 74, i.e., the hydraulic pressure $P_{20}$ and $P_{21}$ in the second and third hydraulic pressure chambers 20 and 21 in the auxiliary hydraulic pressure generating means 3 is zero (0) is required to satisfy an expression (11):

$$P_{71} > F_{73}/SP_{72} \quad (11)$$

wherein $SP_{72}$ represents the pressure receiving area of the opening and closing piston 72 facting to the pilot chamber 71, and $F_{73}$ represents the load of the spring 73.

The hydraulic pressures $P_{20}$ and $P_{21}$ developed in the second and third hydraulic pressure chamber 20 and 21 by development of the hydraulic pressure $P_{16}$ in the auxiliary hydraulic pressure generating means 3 are represented in the following expressions (12) and (13):

$$P_{20} = (P_{16} \times SP_{18} - F_{25})/SP_{18} \quad (12)$$

$$P_{21} = (P_{16} \times SP_{18} - F_{26})/SP_{18} \quad (13)$$

wherein $F_{25}$ and $F_{26}$ represent the loads of the second and third return springs 25 and 26, with the proviso that the pressure receiving areas $SP_{18}$ and $SP_{19}$ at opposite ends of the second and third working piston 18 and 19 are equal to each other ($SP_{18} = SP_{19}$).

Here, to increase the output hydraulic pressures Pc in the output port 39 in the hydraulic pressure supply source hydraulic pressure control means 4 up to a level required to close the on-off valves $67_{FL}$, $67_{FR}$ and $67_R$ before the hydraulic pressures $P_{20\ pl}$ and $P_{21}$ in the second and third hydraulic pressure chambers 20 and 21, the following relationships must be satisfied:

$$P_{20} = P_{21} = 0 \quad (14)$$

$$Pc > P_{71MIN} \quad (15)$$

wherein $P_{71MIN}$ in the expression (15) is the minimum hydraulic pressure in the pilot chamber 71 meeting the expression (11).

If the $P_{71MIN}$ is a lower pressure, and the hydraulic pressure in the pilot chamber 71 is set to the $P_{71MIN}$ when $A < p$ wherein A represents $P_{16}$ upon the generation of $P_{71MIN}$, the following expressions (16), (17) and (18):

$$A \times SP_{18} \leq F_{25} \quad (16)$$

$$A \times SP_{18} \leq F_{26} \quad (17) \text{ and}$$

$$SP_{36}/SP_{35} \times (A - F_{48}/SP_{36}) + F_{54}/SP_{35} > F_{73}/SP_{72} \quad (18)$$

wherein $F_{48}/SP_{36} < A$, are derived from the above expressions (9), (11), (12), (13), (14) and (15).

Setting of the above values to establish the above expressions (16), (17) and (18) permits the operation of the hydraulic pressure supply source hydraulic pressure control means 4 to be started by the hydraulic pressure in the first hydraulic pressure chamber 16 in the auxiliary hydraulic pressure generating means 3 prior to rising of the hydraulic pressures in the second and third hydraulic pressure chambers 20 and 21 in the auxiliary hydraulic pressure generating means 3 during a braking operation of the brake pedal 1, thereby closing the on-off valves $67_{FL}$, $67_{FR}$ and $67_R$. However, in conducting each of the above expressions, the slide resistance of each piston, the spring constant of each spring and the variation in spring load during opening and closing of each value have not been taken into consideration and hence, in practice, it is necessary to set the above-described values in consideration of even those requirements.

The operation of this embodiment will be described below. First, supposing a normal braking operation in a condition in which the hydraulic pressure supply source 2 is in normal operation, the inlet and outlet solenoid valves $7_{FL}$, $7_{FR}$ and $7_R$ and $8_{FL}$, $8_{FR}$ and $8_R$ are in their deexcited states (states as shown in FIG. 1), and the traction-controlling normally-opened solenoid valve 9 and normally-closed solenoid valve 10 are also in their deexcited states (state as shown in FIG. 1). Therefore, the output port 39 in the hydraulic pressure supply source hydraulic pressure control means 4 communicates with the output hydraulic pressure passages $66_F$ and $66_R$, one $66_F$ of which is in communication with the input hydraulic pressure chambers 58 in the hydraulic pressure transmitting means $5_{FL}$ and $5_{FR}$ through the inlet solenoid valves $7_{FL}$ and $7_{FR}$, and the other output hydraulic pressure passage $66_R$ is in communication with the inlet hydraulic pressure chamber 58 in the hydraulic pressure transmitting means $5_R$ through the inlet solenoid valve $7_R$.

If the brake pedal 1 is depressed in such condition, the first working piston 17 of the auxiliary hydraulic pressure generating means 3 is moved forwardly, so that the hydraulic pressure developed in the first hydraulic pressure chamber 16 is applied to the input pressure action chamber 55 in the hydraulic pressure supply source hydraulic pressure control means 4 through the proportional reducing valve 77 and also to the accumulating chamber 91 in the accumulator 78. At this time, the hydraulic pressure supply source hydraulic pressure control means 4 starts its operation earlier than the accumulator 78. Specifically, that pressure receiving area $S_1$ of the urging piston 36 which faces to the input pressure action chamber 55 in the hydraulic pressure supply source hydraulic pressure control means 4, that pressure receiving area $S_2$ of the accumulator piston 92 which faces to the accumulator chamber 91, the set load $f_1$ of the control spring 48 in the hydraulic pressure supply source hydraulic pressure control means 4, and the set load $f_2$ of the first accumulator spring 93 in the accumulator 78 are set to establish the inequality provided by the above-described expression (1).

This permits the urging piston 36 to be advanced prior to the accumulating operation of the accumulator 78 in the hydraulic pressure supply source hydraulic pressure control means 4 and permits the spool 34 having its rear end in abutment against the urging piston 36 to be driven forwardly. Starting the operation of the hydraulic pressure supply source hydraulic pressure control means 4 prior to the accumulating operation of the accumulator 78 in this manner makes it possible to avoid the generation of a wastefull reaction during the braking operation and to prevent any loss of depressing force for the brake pedal 1, thereby providing an improvement in responsibility.

At the time point at which the spool 34 has been advanced by a certain distance in accordance with the forward or advancing movement of the urging piston 36, the output port 39 is put into communication with the input port 40, so that the output hydraulic pressure from the output port 39 in communication with the hydraulic pressure supply source 2 is rapidly increased. Then, the on-off valves $67_{FL}$, $67_{FR}$ and $67_R$ are first closed in response to the increasing of the hydraulic pressures in the oil passage branches $84_{FL}$, 84FR and 84R before the differential pressure across the first unidirectional valves $85_F$ and $85_R$ in the output hydraulic pressure passages $66_F$ and $66_R$ reach the first valve-opening pressure $\Delta P_1$, and then the first unidirectional valves $85_F$ and $85_R$ are opened in response to such differential pressure reaching the first valve-opening pressure $\Delta P_1$. This causes the hydraulic pressure from the output port 39 to be applied to the input hydraulic pressure chambers 58 in the hydraulic pressure transmitting means $5_{FL}$ and $5_{FR}$ through the output hydraulic pressure passage $66_F$ and the inlet solenoid valves $7_{FL}$ and $7_{FR}$, thereby providing a braking pressure to the brake devices $B_{FL}$ and $B_{FR}$. In addition, the hydraulic pressure from the output port 39 is applied to the input hydraulic pressure chamber 58 in the hydraulic pressure transmitting means $5_R$ through the output hydraulic pressure passage $66_R$ and the input solenoid valve $7_R$, and the hydraulic pressure delivered from the output hydraulic pressure chamber 59 in the hydraulic pressure transmitting means $5_R$ is reduced in the proportional reducing valve 6 and provided to the rear wheel brakes $B_{RL}$ and $B_{RR}$. This ensures that during braking, the on-off valves $67_{FL}$, $67_{FR}$ and $67_R$ can be reliably closed prior to the operation of the hydraulic pressure transmitting means $5_{FL}$, $5_{FR}$ and $5_R$, and the braking pressure can be increased concurrently with the operation of the hydraulic pressure transmitting means $5_{FL}$, $5_{FR}$ and $5_R$ to improve the responsibility.

Moreover, during the braking operation, the operation of the hydraulic pressure supply source hydraulic pressure control means 4 by the hydraulic pressure in the first hydraulic pressure chamber 16 is started to close the on-off valves $67_{FL}$, $67_{FR}$ and $67_R$ prior to the rising of the hydraulic pressures in the second and third hydraulic pressure chambers 20 and 21 in the auxiliary hydraulic pressure generating means 3 and therefore, it is possible to prevent the degradation of a braking feeling due to the application of the hydraulic pressure in the second and third hydraulic pressure chambers 20 and 21 to the brake devices $B_{FL}$, $B_{FR}$, $B_{RL}$ and $B_{RR}$.

In addition, the rapid increasing of the hydraulic pressure from the output port 39 ensures that the plays at the individual portions to the brake devices $B_{FL}$, $B_{FR}$, $B_{RL}$ and $B_{RR}$ is eliminated by the supplying of a relatively high hydraulic pressure, and the initial operation of the respective braking pistons of the brake devices $B_{FL}$, $B_{FR}$, $B_{RL}$ and $B_{RR}$ is smoothed.

The communication of the output port 39 with the input port 40 permits the hydraulic pressure in the output hydraulic pressure action chamber 51 to be also increased, causing the reaction piston 35 to be driven rearwardly to abut against the front end of the spool 34, thereby allowing the spool 34 to be retreated to put the output port 39 out of communication with the input port 40. Further depressing of the brake pedal 1 permits the hydraulic pressure in the first hydraulic pressure chamber 16 to be increased, in response to which the spool 34 is again advanced, with the result that the output port 39 is put into communication with the input port 40. In this manner, the spool 34 is reciprocated in accordance with the braking operation of the brake pedal 1 between the front position in which the output port 39 is put into communication with the input port 40 and the rear position in which the output port 39 is put out of communication with the input port 40, whereby the hydraulic pressure from the hydraulic pressure supply source 2 is controlled in accordance with the amount of brake pedal 1 depressed for braking and thus delivered from the output port 39.

In this manner, the hydraulic pressure from the hydraulic pressure supply source 2 can be controlled in the hydraulic pressure supply source hydraulic pressure control means 4 in accordance with the amount of brake pedal 1 depressed for braking, and delivered to the respective brake devices $B_{FL}$, $B_{FR}$, $B_{RL}$ and $B_{RR}$. However, in the hydraulic pressure transmitting means $5_{FL}$, $5_{FR}$ and $5_R$, the brake devices $B_{RL}$, $B_{FR}$, $B_{RL}$ and $B_{RR}$ are isolated from the hydraulic oil circuits extending from the input hydraulic pressure chambers 58 to the hydraulic pressure supply source 2 by the free pistons 60 and hence, a gas having the possibility of flowing into the working oil in the hydraulic pressure supply source 2 cannot adversely affect the brake devices $B_{FL}$, $B_{FR}$, $B_{RL}$ and $B_{RR}$.

In this case, when the hydraulic pressures in the second and third hydraulic pressure chambers 20 and 21 are increased by a reduction in volume thereof due to the increase in hydraulic pressure in the first hydraulic pressure chamber 16 in the auxiliary hydraulic pressure generating means 3 in accordance with the depressing operation of the brake pedal 1, the hydraulic pressure is delivered from the second and third output ports 28 and 29, but the hydraulic pressure cannot be applied to the brake devices BFL, BFR, BRL and $B_{RR}$, because the on-off valves $67_{FL}$, $67_{FR}$ and $67_R$ are closed.

During this braking, the braking force for the left and right rear wheels is required to be lower than that for the left and right front wheels, and the braking force for the left and right rear wheels becomes lower at a given proportion than the left and right front wheel by the fact that the hydraulic pressure from the hydraulic pressure supply source hydraulic pressure control means 4 is reduced by the proportional reducing valve 6.

In addition, the application of the hydraulic pressure in the first hydraulic pressure chamber 16 to the input pressure action chamber 55 through the proportional reducing valve 77 makes it possible to suppress the hydraulic pressure applied to the input pressure action chamber 55 and accumulator 78 to a lower level, which contributes to an alleviation in loading of the hydraulic pressure supply source hydraulic pressure control means 4 and the accumulator 78. Moreover, by reducing the hydraulic pressure from the first hydraulic pressure chamber 16 by the proportional reducing valve 77 and applying the reduced pressure to the input pressure action chamber 55 when the brake pedal 1 has been depressed several times within a range of a play, it is possible to suppress the frequency of increasings of the hydraulic pressure on and after the hydraulic pressure supply source hydraulic pressure control means 4 to a smaller level, thereby reducing the amount of working oil circulated to inhibit any wastefull consumption of the working oil, while at the same time suppressing the frequency of operations of the free pistons 60 in the hydraulic pressure transmitting means $5_{FL}$ to $5_R$ to contribute to an improvement in durability.

Further, the accumulation of the hydraulic pressure from the first hydraulic pressure chamber 16 makes it possible to insure a pedal stroke of the brake pedal 1, thereby unnecessitating any construction for insuring the pedal stroke in the hydraulic pressure supply source hydraulic pressure control means 4, enabling a reduction in size in the hydraulic pressure supply source hydraulic pressure control means 4. Moreover, it is possible to avoid that when a sudden reaction force occurs, it directly acts on the brake pedal 1 due to a dampering by the accumulator 78.

When the depressing force for the brake pedal 1 is too large during such braking, so that the wheels are about to become locked, the inlet solenoid valves $7_{FL}$, $7_{FR}$ and $7_R$ corresponding to the wheels about to become locked are excited to cut off the communication between the output oil passage $66_F$ and the hydraulic pressure transmitting means $5_{FL}$ and $5_{FR}$ as well as between the output hydraulic pressure passage $66_R$ and the hydraulic pressure transmitting means $5_R$. This suppresses the increasing of the braking force to avoid that the wheels are about to become locked. Nevertheless, when the wheels are yet about to become locked, the locking tendency of the wheels can be eliminated by exciting the associated inlet solenoid valves $8_{FL}$, $8_{FR}$ and $8_R$ to put the input hydraulic pressure chambers 58 in the hydraulic pressure transmitting means 5FL to 5R into communication with the reservoir R to reduce the braking pressures.

After the elimination of the above locking tendency, the inlet solenoid valves $7_{FL}$, $7_{FR}$ and $7_R$ are deexcited, while the solenoid valves $8_{FL}$, $8_{FR}$ and $8_R$ are deexcited. This enables the hydraulic pressure from the output port 39 in the hydraulic pressure supply source hydraulic pressure control means 4 to be again applied to the hydraulic pressure transmitting means $5_{FL}$, $5_{FR}$ and $5_R$ to increase the braking pressures.

During boosting in such an anti-lock control condition, the anti-lock control for the both front wheels can be performed more accurately by continuing the operation of the traction-controlling normally-closed solenoid valve 9. More specifically, it is possible to avoid that the hydraulic pressure from the output port 39 is suddenly applied to the inlet solenoid valves $7_{FL}$ and $7_{FR}$ due to the intermittent closing of the solenoid valve 9, thereby smoothing the increasing of the hydraulic pressure. In addition, when in a condition that the left and right front wheels are travelling on a road surface at different friction coefficients, the anti-lock control is being conducted for the front wheel on the road surface at lower one of the different friction coefficients, increasing of the braking pressure for the front wheel on the road surface at the higher friction coefficient can be suppressed by the continued valve-closing operation of the solenoid valve 9 to smoothly inhibit the generation of a yaw moment for the vehicle.

Suppose that a higher hydraulic pressure cannot be obtained from the hydraulic pressure supply source 2 due to troubles of the hydraulic pump 11 or the like during the above-described braking. In this case, the on-off valves $67_{FL}$, $67_{FR}$ and $67_R$ are opened by the reduction of the hydraulic pressures in the branched hydraulic fluid passages $84_{FL}$, $84_{FR}$ and $84_R$ in accordance with the reduction of the hydraulic pressure from the output port 39 in the hydraulic pressure supply source hydraulic pressure control means 4. This causes the hydraulic braking pressures developed in the second and third hydraulic pressure chambers 20 and 21 in the auxiliary hydraulic pressure generating means 3 to be applied directly to the brake devices $B_{FL}$ to $B_{RR}$, respectively, enabling the braking force to be insured.

In this case, the braking pressures for the brake devices $B_{FL}$ to $B_{RR}$ cannot be escaped toward the hydraulic pressure supply source hydraulic pressure control means 4, since the hydraulic pressure transmitting means $5_{FL}$ to $5_R$ are interposed between the corresponding brake devices $B_{FL}$ to $B_{RR}$.

During non-braking after the completion of the braking operation, the on-off valves $67_{FL}$, $67_{FR}$ and $67_R$ are first opened by the reduction of the hydraulic pressures in the branched hydraulic fluid passages $84_{FL}$, $84_{FR}$ and $84_R$ in accordance with the reduction of the hydraulic pressure delivered from the output port 39. Then, the second unidirectional valves $86_F$ and $86_R$ are opened in response to the differential pressure across the second unidirectional valves $86_F$ and $86_R$ becoming the second valve-opening pressure $\Delta P_2$ or more, so that the input hydraulic pressure chambers 58 in the hydraulic pressure transmitting means 5FL to 5R are put into communication with the reservoir R through the hydraulic pressure supply source hydraulic pressure control means 4. This enables the breathing of the output hydraulic pressure chambers 59 in response to the movement of the free pistons 60 in the hydraulic pressure transmitting means $5_{FL}$ to $5_R$ toward the input hydraulic pressure chambers 58. Moreover, the hydraulic pressures in the input hydraulic pressure chambers in the hydraulic pressure transmitting means $5_{FL}$ to $5_R$ can be escaped through the hydraulic pressure releasing unidirectional valves $81_{FL}$, $81_{FR}$ and $81_R$ into the output hydraulic pressure passages $66_F$ and $66_R$ and hence, even if the resistance to the flowing through the inlet solenoid valves $7_{FL}$, $7_{FR}$ and $7_R$ are larger, the releasing of the hydraulic pressures in the input hydraulic pressure chambers 58 can be promptly conducted to return the free pistons 60 to their original positions quickly.

It is also supposed that the hydraulic pressures in the input hydraulic pressure chambers 58 are increased due to an increase in temperature during non-braking in the hydraulic pressure transmitting means $5_{FL}$, $5_{FR}$ and $5_R$, and in this case, the braking pressures may be applied if the hydraulic pressures cannot be escaped. However, the second uni-directional valves $86_F$ and $86_R$ can be opened in response to the increasing of the hydraulic pressures in the input hydraulic pressure chambers 58 to escape an amount of the working oil corresponding to the increment of the hydraulic pressure, because the second valve-opening pressure $\Delta P_2$ for the second unidirectional valves $86_F$ and $86_R$ are smaller than the first valve-opening pressure $\Delta P_1$ for the first unidirectional valves $85_F$ and $85_R$ and set at a relatively small value.

Further, when the driving force of the engine is too large so that the drive wheels are about to become excessively slipped, the traction-controlling normally-opened solenoid valve 9 and normally-closed solenoid valve 10 are excited by the control means 80. This causes the hydraulic pressure from the hydraulic pressure supply source 2 to be applied to the input hydraulic pressure chambers 58 in the hydraulic pressure transmitting means $5_{FL}$ and $5_{FR}$, so that a braking force is produced in the brake devices $B_{FL}$ and $B_{FR}$ for the left and right front wheels which are the drive wheels, thereby avoiding the generation of the excessive slipping. Thereafter, the braking force can be controlled by controlling the excitation and deexcitation of the inlet solenoid valves $7_{FL}$ and $7_{FR}$ and the outlet solenoid valves $8_{FR}$ and $8_{FR}$ as in the above-described anti-lock control.

Moreover, the output hydraulic pressure from the hydraulic pressure supply source 2 is set at a considerably level, but such hydraulic pressure is reduced by the reducing valve 83 down to a level suitable to the control and hence, the traction control cannot be conducted because of the excessively large hydraulic pressure. Therefore, the responsibility for control cannot be reduced and unsmoothed.

The housing 14 of the auxiliary hydraulic pressure generating means 3 and the housing 33 of the hydraulic pressure supply source hyrdraulic pressure control means 4 have been formed separately in the above embodiment, but they may be formed integrally.

Figure 4:
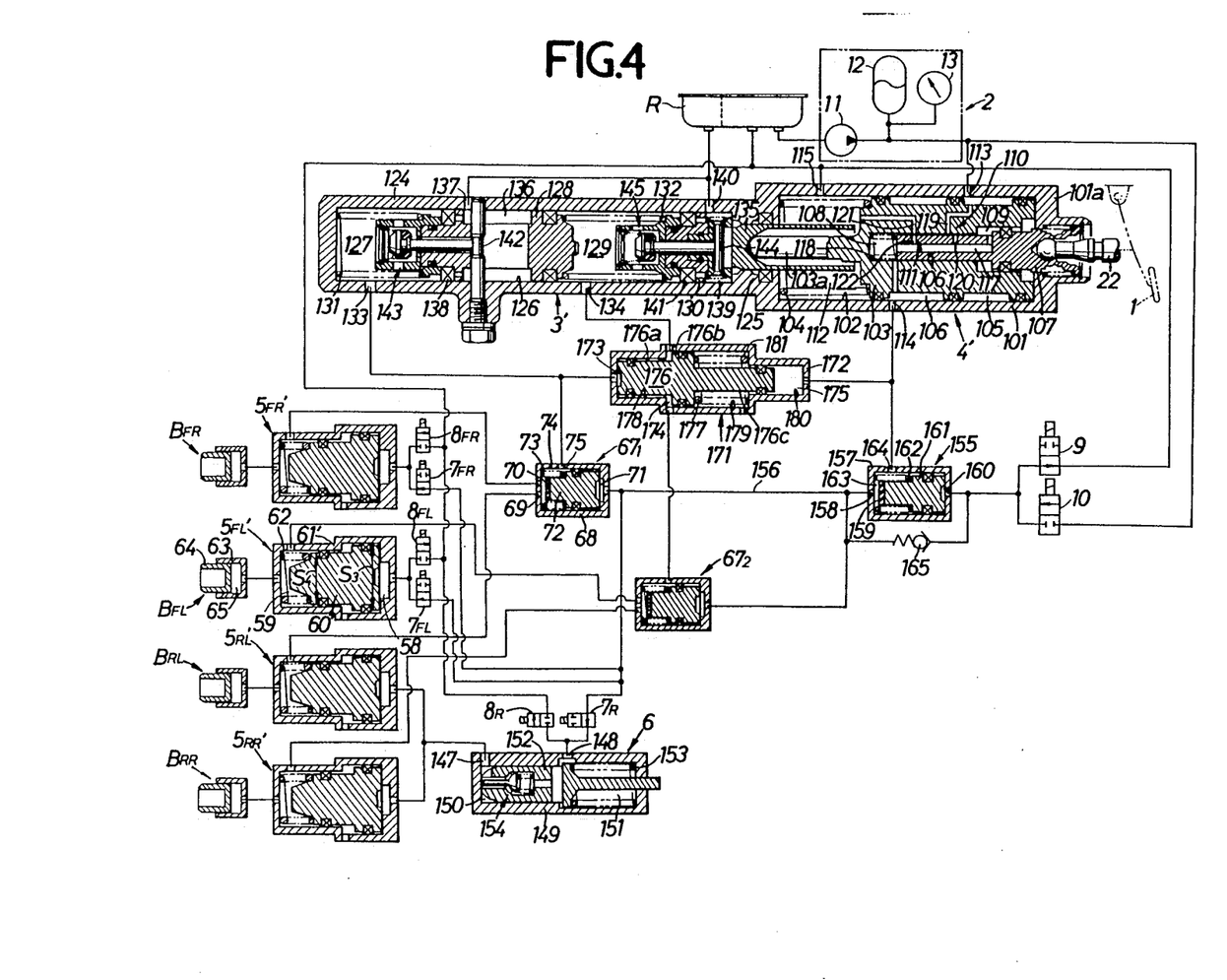
FIG. 4 is a diagram of an oil hydraulic circuit in accordance which another embodiment of the present invention.

FIG. 4 illustrates another embodiment of the present invention, wherein portions corresponding to those in the previously-described embodiment are designated by the same reference characters.

A hydraulic pressure supply source hgyfdraulic pressure control means 4' comprises a housing 101 defining a cylinder bore 102 closed at axially one end by an end wall 101a, a pressure piston 103 slidably received in the cylinder bore 102, a spring 104 provided in a compressed manner between the housing 101 and the pressure piston 103 to bias the pressure piston 103 toward the axially one end, an annular input hydraulic pressure chamber 105 defined between the pressure piston 103 and the housing 101 to communicate with the hydraulic pressure supply source 2, and an annular output hydraulic pressure chamber 106 defined adjacent the input hydraulic pressure chamber 105 between the pressure piston 103 and the housing 101. The control means 4' further includes a reaction piston 107 received in the pressure piston 103 for axially relative sliding movement and connected to the brake pedal 1, a first 108 and a second control hydraulic pressure chamber 109 defined the pressure piston 103 and the reaction piston 107, and inlet and outlet valves 110 and 111 provided between the reaction piston 107 and the pressure piston 103 and adapted to be opened and closed in accordance with the relative movement of the reaction piston 107 and the pressure piston 103.

Two annular grooves are provided in an outer surface of the pressure piston 103 to define an input hydraulic pressure chamber 105 and an output hydraulic pressure chamber 106 between an inner surface of the housing 101 and the outer surface of the pressure piston 103, and the pressure piston 103 and the housing 101 are sealed at the axially opposite sides of the input and output hydraulic pressure chambers 105 and 106. A spring chamber 112 is also defined between the pressure piston 103 and the other end of the housing 101, and a spring 104 contained in the spring chamber 112 biases the pressure piston 103 in an axially one direction (i.e, in a rightward direction as viewed in FIG. 4).

The housing 101 is provided with an input port 113 leading to the input hydraulic pressure chamber 105, an output port 114 leading to the output hydraulic pressure chamber 106 and a release port 115, all irrespective of the axial position of the pressure piston 103. The input port 113 is connected to the hydraulic pressure supply source 2, and the release port 115 is connected to the reservoir R.

A bottomed slide hole 116 opened at axially one end is coaxially made in the pressure piston 103, and the reaction piston 107 slidably received in the slide hole 116. A leading end of an urging rod 22 is connected to a rear end of the pressure piston 107 and adapted to be urged by the brake pedal 1, and the reaction piston 107 is axially driven by the brake pedal 1. Furthermore, the first control hydraulic pressure chamber 108 is defined between a leading end of the reaction piston 107 and a closed end of the slide hole 116, and the second annular control hydraulic pressure chamber 109 is defined between that inner surface portion of the pressure piston 103 which is closer to its rear end and that outer surface portion of the reaction piston 107 which is closer to its rear end. The reaction piston 107 is also provided with a communication passage 117 permitting the communication between the first and second control hydraulic pressure chambers 108 and 109, so that the first control hydraulic pressure chamber 108 normally communicates with the output hydraulic pressure chamber 106. Further, a spring 118 is contained in the first control hydraulic pressure chamber 108 for repulsively biasing the reaction piston 107 in a direction to increase the volumes of the first and second control hydraulic pressure chambers 108 and 109.

The inlet valve 110 is comprised of a valve bore 119 made in the pressure piston 103 and opened into an inner surface of the slide hole 116 to communicate with the input hydraulic pressure chamber 105, and a valve bore 120 made in the reaction piston 107 and opened into an outer surface thereto to communicate with the communication passage 117. When the positions of the valve bores 119 and 120 are axially misaligned from each other, the inlet valve 110 is brought into a closed state, and when the valve bores 119 and 120 assume their aligned positions, the inlet valve 110 is brought into an opened state. The outlet valve 111 is comprised of a valve bore 121 made in the pressure piston 103 and opened into the inner surface of the slide hole 116 to communicate with the spring chamber 112, and a valve bore 122 made in the pressure piston 107 and opened into the outer surface to communicate with the communication passage 117. When positions of the valve bores 121 and 122 are misaligned, the outlet valve 111 is brought into a closed state, and when the valve bores 121 and 122 assume their aligned positions, the outlet valve 111 is brought into an opened state.

When the pressure piston 103 is in its retreat limit position and the reaction piston 107 is also in its retreat limit position as shown in FIG. 4, the inlet valve 110 is its closed state, and the outlet valve 111 is in its opened state. If the reaction piston 107 is advanced from this condition, the outlet valve 111 is closed and then, the inlet valve 110 is opened. This permits the pressure in the first and second control hydraulic pressure chambers 108 and 109 to be increased to advance the pressure piston 103 relative to the reaction piston 107. If doing so, the outlet valve 111 is opened, and the inlet valve 110 is closed.

In this manner, in the hydraulic pressure supply source hydraulic pressure control means 4', the reaction piston 107 and the pressure piston 103 are alternately moved relative to each other in accordance with the depressing operation of the brake pedal 1. This causes the hydraulic pressure proportional to the amount of brake pedal 1 depressed to be developed in the output hydraulic pressure chamber 106. When the hydraulic pressure from the hydraulic pressure supply source 2 has been abnormally reduced for any reasons, advancing movement of the reaction piston 107 in accordance with the depressing operation of the brake pedal 1 results in that the reaction piston 107 abuts against the pressure piston 103 which is then urged by the reaction piston 107 and thus advanced.

Auxiliary hydraulic pressure generating means 3' is known as a tandem type master cylinder and comprises a housing 124 integral with the housing 101 of the hydraulic pressure supply source hydraulic pressure control means 4'. The housing 124 is provided with a cylinder bore 126 coaxial with the cylinder bore 102 in the hydraulic pressure supply source hydraulic pressure control means 4' with a partition wall 125 disposed therebetween. The other end, i.e., front end of the cylinder bore 126 is closed. Slidably received in the cylinder bore 126 are a front working piston 128 defining a hydraulic pressure chamber 127 between the piston 128 itself and a front end wall of the cylinder bore 126, and a rear working piston 130 defining a hydraulic pressure chamber 129 between the piston 130 itself and the working piston 128. A spring 131 is interposed between a front end wall of the housing 124 and the working piston 128 for biasing the working piston 128 rearwardly, and a spring 132 is interposed between the working pistons 128 and 130 for biasing the rear working piston 130 rearwardly. The housing 124 is also provided with an output port 133 leading to the front hydraulic pressure chamber 127 and an output port 134 leading to the rear hydraulic pressure 129.

A rearwardly extending piston rod 135 is secured at its front end to the working piston 130 and oil-tightly and movably passed through the partition wall 125, and a front end of an urging pin 103a is coaxially mounted projectingly on the front end of the pressure pistol 103 in the hydraulic pressure supply source hydraulic pressure control means 4' so as to coaxially abut against the piston rod 135. Thus, in accordance with the forward or advancing movement of the pressure piston 103 in the hydraulic pressure supply source hydraulic pressure control means 4', the working piston 130 is also urged forwardly.

A replenishing oil chamber 136 is defined between an inner surface of the cylinder bore 126 and the working piston 128, and a connecting port 137 is made in the housing 124 for permitting the communication of the replenishing oil chamber 136 with the reservoir R. Moreover, a cup seal 138 is fitted in the working piston 128 for slide contact with the inner surface of the cylinder bore 126, and the cup seal 138 and the working piston 128 are arranged to permit the flowing of a working oil from the replenishing oil chamber 136 to the hydraulic pressure chamber 127 when the pressure in the hydraulic pressure chamber 127 has been reduced more than that in the replenishing oil chamber 136. Further, a replenishing oil chamber 139 is defined between the partition wall 125 and the working piston 130, and the housing 124 is provided with a connecting port 140 which permits the replenishing oil chamber 139 to communicate with the reservoir R. A cup seal 141 is also fitted in the working piston 130 for slide contact with the inner surface of the cylinder bore 126, and the cup seal 141 and the working piston 130 are arranged to permit the flowing of the working fluid from the replenishing oil chamber 139 to the hydraulic pressure chamber 129 when the pressure in the replenishing oil chamber 139 has been reduced more than that in the hydraulic pressure chamber 129.

A valve mechanism 143 is disposed in a front portion of the working piston 128 and adapted to be opened and closed by a stopper pin 142 fixedly mounted to the housing 124 so as to put the hydraulic pressure chamber 127 and the replenishing oil chamber 136 into and out of communication with each other. The valve mechanism 143 is urged and opened by the stopper pin 142 when the working piston 128 has been returned to its retreat limit. A valve mechanism 145 is also disposed in a front portion of the working piston 130 and adapted to be opened and closed by a stopper pin 144 so as to put the hydraulic pressure chamber 129 and the replenishing oil chamber 139 into and out of communication with each other. The stopper pin 144 is substantially integral with the housing 124, and the valve mechanism 145 is opened when the working piston 145 has been returned to its retreat limit.

In such auxiliary hydraulic pressure generating means 3', the rear working piston 130 is urged forwardly by the pressure piston 103 advanced in accordance with the depressing of the brake pedal 1 and correspondingly, the volumes of the hydraulic pressure chambers 127 and 129 are reduced, thereby allowing the hydraulic pressure developed in the hydraulic pressure chambers 127 and 129 to be delivered through the associated output ports 133 and 134.

Hydraulic pressure transmitting means $5_{FL}'$ and $5_{FR}'$ are interposed between the hydraulic pressure supply source hydraulic pressure control means 4' and the associated brake devices $B_{FL}$ and $B_{FR}'$ and hydraulic pressure transmitting means $5_{RL}'$ and $5_{RR}'$ are interposed between the proportional reducing valve 6 and the associated brake devices $B_{RL}$ and $B_{RR}$. In each of the hydraulic pressure transmitting means $5_{FL}'$, $5_{FR}'$, $5_{RL}'$ and $5_{RR}'$, the pressure receiving area $S_3$, facing to the input hydraulic pressure chamber 58, of a free piston 60' slidably received in a cylinder body 61' is set at a larger level than the pressure receiving area $S_4$ facing to the output hydraulic pressure chamber 59.

The inlet solenoid valves $8_{FL}$ and $8_{FR}$ corresponding to the front wheel brake devices $B_{FL}$ and $B_{FR}$ are interposed between the input hydraulic pressure chamber 58 in the associated hydraulic pressure transmitting means $5_{FL}'$ and $5_{FR}'$ and the reservoir R, and the inlet solenoid valve $8_R$ corresponding to the rear wheel brake devices $B_{RL}$ and $B_{RR}$ is interposed between an input port 148 in the proportional reducing valve 6 and the reservoir R. In addition, the inlet solenoid valves $7_{FL}$ and $7_{FR}$ corresponding to the front wheel brake devices $B_{FL}$ and $B_{FR}$ are interposed between the input hydraulic pressure chambers 58 of the associated hydraulic pressure transmitting means $5_{FL}'$ and $5_{FR}'$ and the oil passage 156, and the inlet solenoid valve $7_R$ corresponding to the rear brake devices $B_{RL}$ and $B_{RR}$ is interposed between the input port 148 in the proportional reducing valve 6 and the oil passage 156.

An output port 147 in the proportional reducing valve 6 is commonly connected to the input hydraulic pressure chambers 58 in the hydraulic pressure transmitting means $5_{RL}'$ and $5_{RR}'$ corresponding to the rear wheel brake devices $B_{RL}$ and $B_{RR}$. The proportional reducing valve 6 comprises a valve body 149 having the output port 147 and the input port 148, a piston 152 slidably received in the valve body 149 with its opposited ends facing to the output hydraulic pressure chamber leading to the output port 147 and the input hydraulic pressure chamber 151 leading to the input port 148, a spring 153 contained in the input hydraulic pressure chamber 151 to bias the piston 152 toward the output hydraulic pressure chamber 150, and a valve mechanism 154 provided in the piston 152 to put the input and output hydraulic pressure chambers 151 and 150 into communication with each other in accordance with the movement of the piston 152 toward the output hydraulic pressure chamber 150. Moreover, the pressure receiving area of the piston 152 facing to the input hydraulic pressure chamber 151 is set at a larger level that the pressure receiving area facing to the output hydraulic pressure chamber 150.

Such proportional reducing valve 6 permits the hydraulic pressure in the input port 148 and thus in the input hydraulic pressure chamber 151 to be proportionally reduced and delivered from the output port 147 after the hydraulic pressure supplied from the input port 148 into the input hydraulic pressure chamber 151 has exceeded a given value dependent upon the spring 153.

The output port 114 in the hydraulic pressure supply source hydraulic pressure control means 4' is connected through a selector valve 155 to an oil passage 156. The selector valve 155 comprises of a cylindrical selector valve body 157 closed at its opposite ends, a valve bore 158 made in one end wall of the valve body 157 to communicate with the oil passage 156, a selector piston 161 slidably received in the valve body 157 and having at one end a valve element 159 capable of closing the valve bore 158 with the other end facing to a pilot chamber 160, and a spring 162 interposed between the valve body 157 and the selector piston 161 to bias the latter toward the pilot chamber 160.

A valve chest 163 is defined between one end wall of the selector valve body 157 and the selector piston 161 and adapted to communicate with the valve bore 158, and the spring 162 is contained in the valve chest 163. The selector valve body 157 in provided with an inlet port 164 which communicates with the valve chest 163 and also with the output port 114 in the hydraulic pressure supply source hydraulic pressure control means 4'.

When the hydraulic pressure in the pilot chamber 160 is lower than a given value, the selector piston 161 is moved toward the pilot chamber 160 to a position where the valve element 159 opens the valve bore 158, resulting in the selector valve 155 opened. When the hydraulic pressure in the pilot chamber 160 is more than the given value, the selector piston 161 is moved so that the valve element 159 closes the valve bore 158, resulting in the selector valve 155 closed. Therefore, it is possible to change over the connection and disconnection between the output port 114 in the hydraulic pressure supply source hydraulic pressure control means 4' and the oil passage 156 by controlling the hydraulic pressure in the pilot chamber 160.

The traction-controlling normally-opened solenoid valve 9 is inperposed between the pilot chamber 160 and the reservoir R. On the other hand, the traction-controlling normally-opened solenoid valve 10 is inperposed between the pilot chamber 160 and the hydraulic pressure supply source 2. Thus, with both the solenoid valves 9 and 10 deexcited, the selector valve 155 is open because of a lower hydraulic pressure in the pilot chamber 160. When both the solenoid valves 9 and 10 are excited, the selector valve 155 is closed in response to a higher hydraulic pressure from the hydraulic pressure supply source being applied to the pilot chamber 160.

These solenoid valves 9 and 10 are connected with the oil passage 156 through a unidirectional valve 165 bypassing the selector valve 155. The unidirectional valve 165 permits the flowing of the working oil toward the oil passage 156, and with both the traction controlling solenoid valves 9 and 10 excited, the hydraulic pressure supply source 2 is permitted to communication with the oil passage 156.

The output port 133 in the auxiliary hydraulic pressure generating means 3' is connected to the right front and left rear wheel brakes $B_{FR}$ and $B_{RL}$ through an on-off valve $67_1$, and the output port 134 is connected to the left front and right rear wheel brake devices $B_{FL}$ and $B_{RR}$ through an on-off valve $67_2$. The on-off valves $67_1$ and $67_2$ have basically the same construction as the on-off valves $67_{FL}$, $67_{FR}$ and $67_R$ shown in FIG. 1, but an end wall of an on-off valve body 68 is provided with a pair of valve bores 69 which can be collectively opened and closed by a valve body 70. Moreover, one of the valve bores 69 in the on-off valve $67_1$ communicates with the output hydraulic pressure chamber 59 in the hydraulic pressure transmitting means $5FR'$, and the other valve bore 69 communicates with the output hydraulic pressure chamber 59 in the hydraulic pressure transmitting means $5_{RL}'$. One of the valve bores 69 in the on-off valve $67_2$ communicates with the output hydraulic pressure chamber 59 in the hydraulic pressure transmitting means $5_{FL}'$, and the other valve bore 69 communicates with the output hydraulic pressure chamber 59 in the hydraulic pressure transmitting means $5_{RR}'$. Thus, with a higher pressure pressure in the oil passage 156 and thus in the pilot chamber 71, the the on-off valve $67_1$ is closed to put the output port 133 and the brake devices $B_{FR}$ and $B_{RL}$ out of communication with each other, while the on-off valve $67_2$ is closed to put the output port 134 and the brake devices $B_{FL}$ and $B_{RR}$ out of communication with each other. When the hydraulic pressure in the oil passage 156 becomes lower, the on-off valve $67_1$ is opened to put the output port 133 and the brake device $B_{FR}$ and $B_{RL}$ into communication with each other, while the on-off valve $67_2$ is opened to put the output port 134 and the brake devices $B_{FL}$ and $B_{RR}$ into communication with each other.

An accumulator 171 is connected between the output port 133 in the auxiliary hydraulic pressure generating means 3' and the input port 75 in the on-off valve $67_1$, between the output port 134 in the auxiliary hydraulic pressure generating means 3' and the input port 75 in the on-off valve $67_2$ as well as between the output port 114 in the hydraulic pressure supply source hydraulic pressure control means 4' and the input port 164 in the selector valve 155. The accumulator 171 comprises an accumulator body 172 basically formed into a cylindrical shape with its opposite ends closed, accumulator piston 176 slidably received in the accumulator body 172 to define a first accumulating chamber 173 leading to the output port 133, a second accumulating chamber 174 leading to the output port 134 and a back pressure chamber 175 leading to the output port 114 between the accumulator piston 176 and the accumulator body 172, and a reaction spring 177 interposed between the accumulator body 172 and the accumulator piston 176 for biasing the accumulator piston 176 in a direction to decrease the volumes of the first and second accumulating chambers 173 and 174 and increase the volume of the back pressure chamber 175.

Coaxially provided in a line in the accumulator body 172 are, in sequence from its axially one end toward the other end, a first slide bore 178, a second slide bore 179, and a third slide bore 180. The inside diameters of the slide bores 178 to 180 may be set so that the inside diameter of the second slide bore 179 > the inside diameter of the first slide bore 178 > the inside diameter of the third slide bore 180. On the other hand, the accumulator piston 176 is comprised of a middle diameter portion 176a slidably received in the first slide bore 178, a larger diameter portion 175b slidably received in the second slide bore 179, and a smaller diameter portion 176c slidably received in the third slide bore 180, which portions are coaxially connected in this sequence. The first accumulating chamber 173 is defined between an end wall of the first slide bore 178 and an end face of the middle diameter portion 176a; the second accumulating chamber 174 is defined between a step between the first and second slide bores 178 and 179 and a step between the middle diameter portion 176a and the larger diameter portion 176b, and the back pressure chamber 175 is defined between an end wall of the third slide bore 180 and an end face of the smaller diameter portion 176c. A spring chamber 181 is also defined between a step between the second and third slide bores 179 and 180 and a step between the larger and smaller diameter portions 176b and 176c and opened to the atmosphere, and the reaction spring 177 is contained in the spring chamber 181. Moreover, the spring constant of the reaction spring 177 is set so as to become larger as the load increases.

The operation of this embodiment will be described below. First, supposing a normal braking operation in a condition in which the hydraulic pressure supply source 2 is in normal operation, the inlet solenoid valves $7_{FL}$, $7_{FR}$ and $7_R$ and the inlet solenoid valves $8_{FL}$, $8_{FR}$ and $8_R$ are in their deexcited states (i.e., in states shown in FIG. 4), and the traction-controlling normally-opened solenoid valve 9 and the traction-controlling normally-closed solenoid valve 10 are also in their deexcited states (i.e., in states shown in FIG. 4). Therefore, the selector valve 155 is open, and the output port 114 in the hydraulic pressure supply source hydraulic pressure control means 4' is in communication with the oil passage 156.

When the brake pedal 1 is depressed in such condition, the hydraulic pressure from the hydraulic pressure supply source 2 is controlled in accordance with the amount of brake pedal depressed in the hydraulic pressure supply source hydraulic pressure control means 4', and the controlled hydraulic pressure is delivered from the output port 114 and applied to the back pressure chamber 175 in the accumulator 171 and also to the oil passage 156. Thus, the hydraulic pressure from the output port 114 is increased in the hydraulic pressure transmitting means $5_{FL}'$ and $5_{FR}'$ and applied to the brake devices $B_{FL}$ and $B_{FR}$, and the hydraulic pressure reduced by the proportional reducing valve 6 is further increased in the hydraulic pressure transmitting means $5_{RL}'$ and $5_{RR}'$ and applied to the brake devices $B_{RL}$ and $B_{RR}$.

The hydraulic braking pressure increased in the hydraulic pressure transmitting means $5_{FL}'$, $5_{FR}'$, $5_{RL}'$ and $5_{RR}'$ corresponding to the brake devices $B_{FL}$, $B_{FR}$, $B_{RL}$ and $B_{RR}$, is applied in this manner, and even if the output hydraulic pressure in the hydraulic pressure supply source 2 is set at a relatively low level, it is possible to achieve a sufficient braking pressure in each of the brake devices $B_{FL}$, $B_{FR}$, $B_{RL}$ and $B_{RR}$. This permits the load of the hydraulic pressure supply source 2 to be alleviated, enabling a reduction in size of the hydraulic pressure supply source 2, i.e., of the accumulator 12 and the like.

It should be noted that the hydraulic pressure is delivered even from the output port 133 and 134 in the auziliary hydraulic pressure generating means 3' as a result of driving of the working pistons 128 and 130 in accordance with the depressing operation of the brake pedal 1. However, the on-off valves $67_1$ and $67_2$ has been closed because of a higher hydraulic pressure in the oil passage 156, and the hydraulic pressures from the output ports 133 and 134 increases the volumes of the first and second accumulating chambers 173 and 174. This makes it possible to insure a stroke of the brake pedal 1. Moreover, only one accumulator 171 is required for the output ports 133 and 134, which contributes to a reduction in number of parts.

Since the reaction spring 177 in the accumulator 171 has its spring constant set so as to become larger as the load increases, it is possible to increase the reaction force as the amount of brake pedal depressed increases, leading to an improved feeling of braking operation. Moreover, because the hydraulic pressure controlled in the hydraulic pressure supply source hydraulic pressure control means 4' is introduced into the back pressure chamber 175, the reaction spring 177 can be reduced in size to contribute to a reduction in size of the accumulator 171, and at the same time, the initial braking operation of the brake pedal 1 can be smoothed by a construction such that the hydraulic pressure in the back pressure chamber 175 is gradually higher depending upon the braking operation as compared with the direct introduction of the hydraulic pressure in the hydraulic pressure supply source 2 into the back pressure chamber 175.

Suppose that a higher hydraulic pressure could not be obtained from the hydraulic pressure supply source during braking due to any troubles of the hydraulic pump 11 or the like. In this case, the on-off valves $67_1$ and $67_2$ are opened in response to the reduction of the hydraulic pressure in the oil passage 156 connected to the hydraulic pressure supply source hydraulic pressure control means 4'. This enables the hydraulic pressure developed in the auxiliary hydraulic pressure generating means 3' to be applied directly to the brake devices $B_{FL}$ to $B_{RR}$, thereby insuring a braking force. In this case, each of the on-off valves $67_1$ and $67_2$ opens the pair of valve bores 69 concurrently, so that the hydraulic pressure from the auxiliary hydraulic pressure generating means 3' is supplied to the brake devices $B_{FR}$, $B_{RL}$; $B_{FL}$, $B_{RR}$ concurrently. This ensures that the brake devices $B_{FR}$, $B_{RL}$, $B_{FL}$ and $B_{RR}$ are synchronously operated.

Moreover, for the left and right rear wheels, the hydraulic pressure is applied through t e proportional reducing valve 6 during braking, whereas the hydraulic pressure from the auxiliary hydraulic pressure generating means 3' is applied directly when the hydraulic pressure supply source 2 is in failure, and therefore, it is possible to insure a sufficient braking force.

Then, suppose that there is a defect in hydraulic pressure occuring in either of the oil hydraulic circuit connecting the output port 133 in the auxiliary hydraulic pressure generating means 3' with the right front wheel brake device $B_{FR}$ and the left rear wheel brake device $B_{RL}$ or the oil hydraulic circuit connecting the output port 134 in the auxiliary hydraulic pressure generating means 3' with the left front wheel brake device $B_{FL}$ and the right rear brake device $B_{RR}$, and moreover, the hydraulic pressure supply source 2 is in failure. In this case, it is possible to insure a braking force in either of the brake devices $B_{FR}$ and $B_{RL}$ or the bgrake devices $B_{FL}$ and $B_{RR}$ by the hydraulic pressure developed in the auxiliary hydraulic pressure generating means 3' and moreover, it is possible to reduce the movement of the reaction piston 176 in the accumulator 171 at that time than that when both the hydraulic circuits are normal and to inhibit the stroke of the brake pedal 1 from being increased.

During non-bgraking after the completion of the braking operation, the on-off valves $67_1$ and $67_2$ can be opened due to the reduction of the hydraulic pressure in the oil passage 156 to put the output hydraulic pressure chambers 59 in the hydraulic pressure transmitting means $5_{FL}'$ to $5_{RR}'$ into communication with the reservoir R through the auxiliary hydraulic pressure generating means 3'. This avoids the generation of a negative pressure in the output hydraulic pressure chambers 59 in accordance with the movement of the free pistons 60' in the hydraulic pressure transmitting means $5_{FL}'$ to $5_{RR}'$ toward the input hydraulic pressure chambers 58 and eliminates the need for a reservoir which must be otherwise provided specially.

Further, during a traction control, the traction-controlling normally-opened and normally closed solenoid valves 9 and 10 are excited, and the the inlet solenoid valve $7_R$ corresponding to the left and right rear wheels which are driven wheels is excited. This caused the selector valve 155 to be closed, so that the higher hydraulic pressure from the hydraulic pressure supply source 2 is applied to the input hydraulic pressure chambers 58 in the hydraulic pressure transmitting means $5_{FL'}$ and $5_{FR'}$, whereby a braking force is generating in the brake device $B_{FL}$ and $B_{FR}$ for left and right wheels which are driving wheels, and the generation of the slipping is avoided.

What is claimed is:

1. A hydraulic braking pressure control system comprising auxiliary hydraulic pressure generating means connected to a brake device for generating a hydraulic pressure depending upon a braking operation by a brake pedal; a hydraulic pressure supply source; hydraulic pressure supply source hydraulic pressure control means capable of controlling the hydraulic pressure from said hydraulic pressure supply source in accordance with the braking operation by said brake pedal; hydraulic pressure transmitting means which is interposed in a hydraulic pressure path extending from said hydraulic pressure supply source via said hydraulic pressure supply source hydraulic pressure control means to said brake device and which is arranged to permit the transmission of the hydraulic pressure output from said hydraulic pressure supply source hyrdraulic pressure control means to said brake device when the hydraulic pressure in said hydraulic pressure supply source is normal and to cut off the flowing of a working fluid from said brake device toward said hydraulic pressure supply source when the hydraulic pressure in said hydraulic pressure supply source is abnormally reduced; and an on-off valve interposed between said auxiliary hydraulic pressure generating means and said brake device, having a pilot chamber leading to an output port of said hydraulic pressure supply source hydraulic pressure control means, and adapted to be closed in response to an increase in the hydraulic pressure in said pilot chamber, wherein said on-off valve is closed by rising of the output hydraulic pressure from said hydraulic pressure supply source hydraulic pressure control means prior to rising of the output hydraulic pressure from said auxiliary hydraulic pressure generating means during a braking operation by said brake pedal.

2. A hydraulic braking pressure control system comprising auxiliary hydraulic pressure generating means connected to a brake device for generating a hydraulic pressure depending upon a braking operation by a brake pedal; a hydraulic pressure supply source; hydraulic pressure supply source hydraulic pressure control means capable of controlling the hydraulic pressure from said hydraulic pressure supply source in accordance with the braking operation by said brake pedal; hydraulic pressure transmitting means which is interposed in a hydraulic pressure path extending from said hydraulic pressure supply source via said hydraulic pressure supply source hydraulic pressure control means to said brake device and which is arranged to permit the transmission of the hydraulic pressure output from said hydraulic pressure supply source hyrdraulic pressure control means to said brake device when the hydraulic pressure in said hydraulic pressure supply source is normal and to cut off the flowing of a working fluid from said brake device toward said hydraulic pressure supply source when the hydraulic pressure in said hydraulic pressure supply source is abnormally reduced; and an on-off valve interposed between said auxiliary hydraulic pressure generating means and said brake device, having a pilot chamber leading to an output port of said hydraulic pressure supply source hydraulic pressure control means, and adapted to be closed in response to an increase in the hydraulic pressure in said pilot chamber, said hydraulic pressure transmitting means comprising a free piston slidably received in a cylinder body with opposite ends of the piston facing an input hydraulic pressure chamber leading to an output port of said hydraulic pressure supply source hydraulic pressure control means and an output hydraulic pressure chamber leading to said brake device, respectively;

said system further including a branched hydraulic fluid passage diverged from an output hydraulic pressure passage which connects the output port of said hydraulic pressure supply source hydraulic pressure control means with an input hydraulic pressure chamber of said hydraulic pressure transmitting means, said branched hydraulic fluid passage leading to said pilot chamber, a first unidirectional valve for permitting the flowing of a working fluid from said hydraulic pressure supply source hydraulic pressure control means toward said hydraulic pressure transmitting means in response to the application of a differential pressure more than a present level, and a second unidirectional valve adapted to be opened in response to the application of a differential pressure more than a preset level to permit the flowing of the working fluid from said hydraulic pressure transmitting means toward said hydraulic pressure supply source hydraulic pressure control means, said first and second unidirectional valves being disposed in parallel in a section of said output hydraulic pressure passage extending from a diverged point of said branched hydraulic fluid passage to said hydraulic pressure transmitting means.

3. A hydraulic braking pressure control system comprising auxiliary hydraulic pressure generating means connected to a brake device for generating a hydraulic pressure depending upon a braking operation by a brake pedal; a hydraulic pressure supply source; hydraulic pressure supply source hydraulic pressure control means capable of controlling the hydraulic pressure from said hydraulic pressure supply source in accordance with the braking operation by said brake pedal; hydraulic pressure transmitting means which is interposed in a hydraulic pressure path extending from said hydraulic pressure supply source via said hydraulic pressure supply source hydraulic pressure control means to said brake device and which is arranged to permit the transmission of the hydraulic pressure output from said hydraulic pressure supply source hyrdraulic pressure control means to said brake device when the hydraulic pressure in said hydraulic pressure supply source is normal and to cut off the flowing of a working fluid from said brake device toward said hydraulic pressure supply source when the hydraulic pressure in said hydraulic pressure supply source is abnormally reduced; and an on-off valve interposed between said auxiliary hydraulic pressure generating means and said brake device, having a pilot chamber leading to an output port of said hydraulic pressure supply source hydraulic pressure control means, and adapted to be closed in response to an increase in the hydraulic pressure in said pilot chamber, wherein the brake device is formed of a plurality of brake devices and said on-off valve is constructed to have a valve element which is capable of collectively opening and closing a plurality of valve bores leading to the plurality of brake devices and which is operable to close said valve bores in response to an increase in the hydraulic pressure in said pilot chamber.

* * * * *